United States Patent
Brew et al.

(10) Patent No.: US 10,373,070 B2
(45) Date of Patent: Aug. 6, 2019

(54) ANOMALY DETECTION MODEL SELECTION AND VALIDITY FOR TIME SERIES DATA

(71) Applicant: International Business Machines Corporation, Armonk, NY (US)

(72) Inventors: Anthony T. Brew, Dublin (IR); Donagh S. Horgan, Cork (IR); Ian Manning, Cork (IR); Vinh Tuan Thai, Cork (IR)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 14/882,694

(22) Filed: Oct. 14, 2015

(65) Prior Publication Data
US 2017/0109630 A1   Apr. 20, 2017

(51) Int. Cl.
*G06N 99/00* (2010.01)
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 8,145,745 B1 | 3/2012 | Ge et al. | |
| 8,244,651 B1 | 8/2012 | Lin et al. | |
| 8,554,703 B1 | 10/2013 | Lin et al. | |
| 8,645,304 B2 | 2/2014 | Jiang et al. | |
| 8,676,964 B2 | 3/2014 | Gopalan et al. | |
| 8,688,620 B2 | 4/2014 | Viswanathan et al. | |
| 8,706,659 B1 | 4/2014 | Mann et al. | |
| 8,914,317 B2 | 12/2014 | Biem | |
| 8,972,332 B2 | 3/2015 | Ruhl et al. | |
| 2005/0234753 A1 | 10/2005 | Pinto et al. | |
| 2005/0278322 A1* | 12/2005 | Fan | G06N 99/005 |
| 2007/0260568 A1* | 11/2007 | Perng | G06N 5/025 706/47 |
| 2008/0071721 A1* | 3/2008 | Wang | G06N 99/005 706/48 |
| 2008/0167837 A1* | 7/2008 | Basak | G06K 9/00503 702/179 |
| 2010/0082638 A1* | 4/2010 | Marvasti | G06F 17/18 707/748 |
| 2014/0108640 A1 | 4/2014 | Mathis | |
| 2014/0298098 A1 | 10/2014 | Poghosyan et al. | |

OTHER PUBLICATIONS

Chandola, Varun et al.; Anomaly Detection for Discrete Sequences: A Survey; 2012; IEEE Transactions on Knowledge and Data Engineering, vol. 24, No. 5; pp. 823-839. (Year: 2012).*

(Continued)

*Primary Examiner* — Stanley K. Hill
(74) *Attorney, Agent, or Firm* — Reza Sarbakhsh

(57) ABSTRACT

Deploying a model for anomaly detection in time series data. A period of data is received. A model of the period of data is received. It is determined that the model fits a part of the period of data and that the fitted part of the period of data includes the most recent data. A reduced model for the part of the period of data that fit the received model is built. The reduced model is deployed.

20 Claims, 7 Drawing Sheets

(56) References Cited

OTHER PUBLICATIONS

Keogh, Eamonn et al.; Finding the most unusual time series subsequence: algorithms and applications; 2006; Springer-Verlag London; Knowledge and Information Systems (2006) 11(1): 1-27. (Year: 2006).*
Gupta, Manish et al.; Outlier Detection for Temporal Data: A Survey; 2014 IEEE Transactions on Knowledge and Data Engineering, vol. 26, No. 9; pp. 2250-226. (Year: 2014).*
Gama, Joao et al.; A Survey on Concept Drift Adaptation; 2014 ACM Computing Surveys, vol. 46, No. 4, Article 44; pp. 1-37. (Year: 2014).*
Zliobaite, Indre; Learning under Concept Drift: On Overview; 2010 Vilnius University, Lithuania; pp. 1-36. (Year: 2010).*
Bifet, Albert e al.; Learning from Time-Changing Data with Adaptive Windowing; 2007 Universitat Politecnica de Catalunya; 36 pages. (Year: 2007).*
Hulten, Geoff et al.; Mining Time-Changing Data Streams; 2001 ACM; pp. 97-106. (Year: 2001).*
Maruyama, "Dynamic Model Selection with Its Applications to Computer Security", 2004 IEEE, ITW 2004, San Antonio, TX, Oct. 24-29, 2004, pp. 82-87.
Tax et al., "A Consistency-Based Model Selection for One-class Classification", 2004 IEEE, pp. 1-4.
Salvador et al., "Learning States and Rules for Detecting Anomalies in Time Series", Applied Intelligence 23, vol. 3, pp. 241-255, Dec. 2005.

* cited by examiner

ANOMALY DETECTION MODEL SELECTION AND VALIDITY FOR TIME SERIES DATA

BACKGROUND

The present invention relates generally to processing time series data, and more particularly to selecting and validating anomaly detection models for time series data.

A data analysis tool uses behavioral learning algorithms to build an anomaly detection model based on a set of time series data. Such a model can cover individual metrics from a set, or subset of the metrics. When new data arrives for these metrics, they are then evaluated using such a model, and when the new data does not fit the model, an alarm is generated. If multiple anomaly detection models cover data from an individual metric, then multiple symptoms of bad behavior can be observed with these metrics.

A data analysis tool can use time series data from many types of data domains, including a data layer such as an applications layer, an operations system layer, a middleware layer, or a physical network layer, such as a communication transport layer. Data in these domains can dramatically change without notice, for instance, due to a service impacting issue, a maintenance window, or a re-purposing of a piece of equipment.

It is important when applying a specific anomaly detection technique to verify that the training data that created the model fits the data. This is similar to a statistical distribution test, such as a bell curve test, that verifies whether an observed sample comes from the expected distribution.

In some domains, it is common for a data set to have anomalies, and this is what makes the identification of a poor statistical model difficult. The identification of a poor model must be able to distinguish between a model that does not describe the data well and one that contains anomalies or changes but still accurately describes the data.

One drawback of current methods is that they do not take into account the time-ordered sequence of the data. Another drawback is that they do not take into account that the model may not fit contiguously when a change occurs in an underlying system.

This means that more anomaly detection models than is necessary may be discarded, potentially leaving sections of the infrastructure unprotected by automated anomaly detection. Furthermore, models that could have been deployed are not, meaning that a reduced set of information of symptoms observed on a metric may be reported.

SUMMARY

Embodiments of the present invention disclose a computer-implemented method, system, and computer program product for deploying an anomaly detection model for time series data. A period of data is received. A model of the period of data is received. It is determined that the received model fits a part of the period of data, and that the fitted part of the period of data includes the most recent data. A reduced model for the part of the period of data that fit the received model is built. The reduced model is deployed.

3B is another flow diagram of a process, in accordance with an embodiment of the present invention.

FIGS. 4A to 4E are example periods of data anomalies with corresponding operation, in accordance with an embodiment of the present invention.

DETAILED DESCRIPTION

Embodiments of the present invention disclose a computer-implemented method, system, and computer program product for deploying an anomaly detection model.

The embodiments take into account the time-ordered sequence of the data when a change occurs in an underlying system.

A period of data is a time series representing a measurement over time, so if a dramatic change is identified on the time line, a decision can be made regarding the usability of a portion of the data.

When an anomaly occurs in the incoming data, it is common to see a small impact on the metrics for a short duration of time at the beginning of a period of data. For example, FIG. 4C, shows a short-lived, resolved anomaly occurring at the start of the period or the oldest part of the period. Such anomalies are generally short-lived and do not make up a significant portion of the training set, so their inclusion does not adversely affect the model fit, whereas too many short-lived anomalies are an indication of the anomaly model not fitting its data well. When a phase change occurs, as shown, for example, in FIG. 4B, it diverges from a significant amount of the model enough for a rejection of the model. Potentially, FIG. 4D also shows a phase change, but there is not enough data to check this, as the change starts at the end of the period of the data. In any case, this is unknown and the model cannot be deployed as a reliable or accurate model. As a phase change becomes more prominent in the training data, it also becomes a new norm and not a short-lived issue. This observation has led to embodiments that modify a model fitting routine to take advantage of incoming phase changes. These embodiments provide a way to reduce the number of discarded, but valid, anomaly detection models, built using time series data, while remaining accurate and robust.

The model is preferably deployed if the determined part of the period is the newest part of the period and the newest part is not less than a threshold ratio of the whole period. More advantageously, the threshold ratio of the determined part to whole period is 50%. After 50% the model is considered not useful although some embodiments might find a use for a model that fits less than 50% of the data. An alarm or alert might be raised, informing users of the type of pattern that has been fit.

The embodiments herein are described in terms of an anomaly model deploy system of an anomaly detection system, but other embodiments are envisaged that are part of the anomaly detection system itself, whereby an anomaly is not identified if the anomaly is detected in a part of a period of a model that has been flagged as a reduced deploy.

Figure 1:
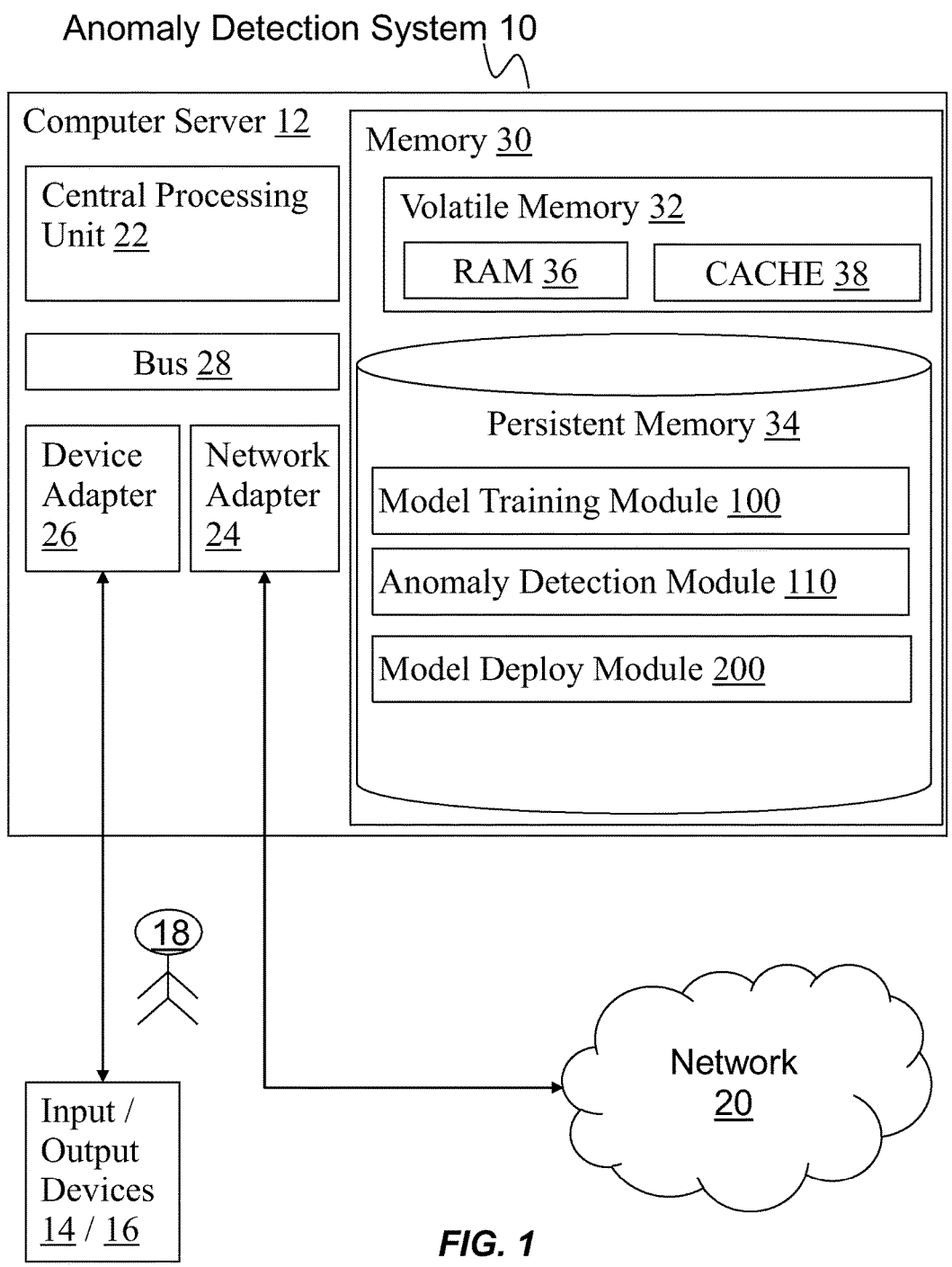
FIG. 1 is a hardware environment diagram, in accordance with an embodiment of the present invention.

FIG. 1 depicts a hardware environment in anomaly detection system 10, in accordance with an embodiment of the invention. Anomaly detection system 10 is operational with numerous other general purpose or special purpose computing system environments or configurations. Examples of well-known computing processing systems, environments, and/or configurations that may be suitable for use with anomaly detection system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment for example where computer processing systems are distributed as a network of objects that can interact with a computing service.

Anomaly detection system 10 may be described in the general context of computer system-executable instructions, such as program modules, being executed by a computer processor. Generally, program modules may include routines, programs, objects, components, logic, and data structures that perform particular tasks or implement particular abstract data types. Anomaly detection system 10 may be embodied in distributed cloud computing environments where tasks are performed by remote processing devices that are linked through a communications network. In a distributed cloud computing environment, program modules may be located in both local and remote computer system storage media including memory storage devices.

Anomaly detection system 10 comprises: general-purpose computer server 12 and one or more input devices 14 and output devices 16 directly attached to the computer server 12. Anomaly detection system 10 is connected to a network 20. Anomaly detection system 10 communicates with a user 18 using input devices 14 and output devices 16. Input devices 14 include one or more of: a keyboard, a scanner, a mouse, trackball or another pointing device. Output devices 16 include one or more of a display or a printer. Anomaly detection system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Anomaly detection system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the exemplary embodiment comprises: model training module 100, anomaly detection module 110, and reduced model deploy module 200. In one embodiment, ROM in the memory 30 stores modules 100 and 200 that enables the computer server 12 to function as a special purpose computer specific to the module 200. Further program modules that support the exemplary embodiment but are not shown include firmware, boot strap program, operating system, and support applications. Each of the operating system, support applications, other program modules, and program data or some combination thereof, may include an implementation of a networking environment.

Anomaly detection system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with anomaly detection system 10. Examples, include, but are not limited to: microcode, device drivers, redundant processing units, external disk drive arrays, redundant array of independent disks (RAID), tape drives, and data archival storage systems.

Model training module 100 takes training data and builds an anomaly detection model, in an embodiment of the invention.

Anomaly detection module 110 performs anomaly detection using the anomaly detection model, in an embodiment of the invention.

Model deploy module 200 tests the anomaly detection model against the training data that built it, in an embodiment of the invention.

Figure 2:
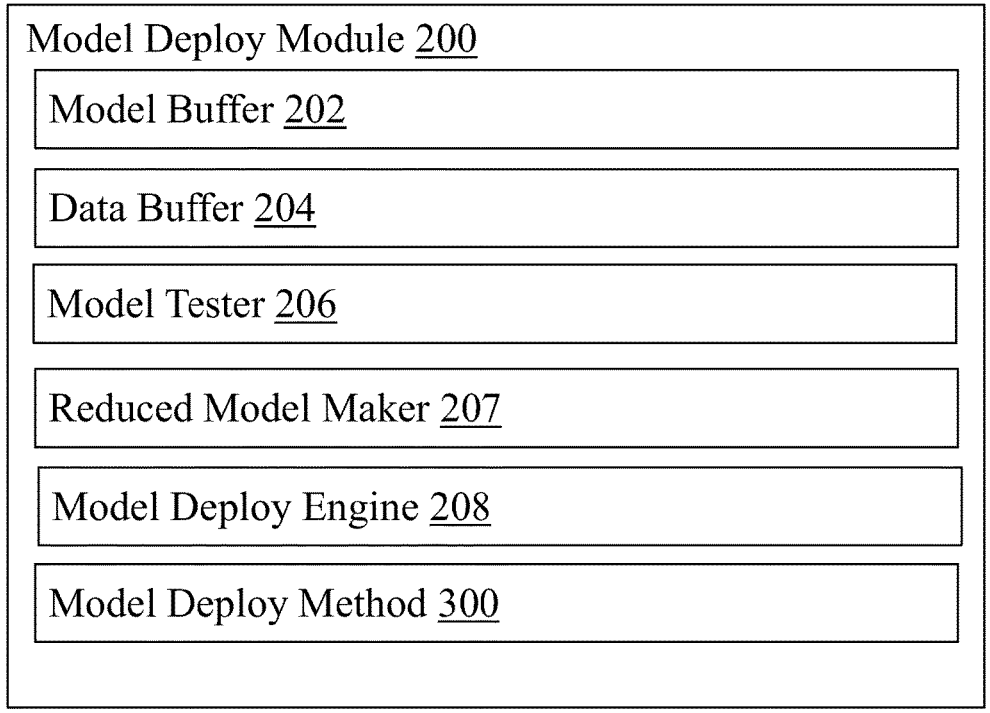
FIG. 2 is a component diagram, in accordance with an embodiment of the present invention.

Referring to FIG. 2, model deploy module 200 comprises the following components: model buffer 202, data buffer 204, model tester 206, reduced model maker 207, model deploy engine 208, and model deploy method 300.

Model buffer 202 operates to receive an anomaly detection model, built using a period of incoming data, in an embodiment of the invention.

Data buffer 204 operates to store the period of data used to test the model, in an embodiment of the invention.

Model tester 206 operates to test the model with the stored period of data, in an embodiment of the invention. In one test of an exemplary embodiment, the period of data is a period of incoming data and the purpose of the primary test is to test for internal consistency of the model training module 100. In another test of the exemplary embodiment, the period of data is a period of incoming data.

Reduced model maker 207 operates to build a reduced model when only a part of the period of data fits the received model, in an embodiment of the invention. In an exemplary embodiment, the period of the model is defined by upper and lower period parameters of the model and building a reduced model comprises reducing the period of the model by reducing the defined upper and/or lower period parameters of the model. In other embodiments, the period of the model may be defined in other ways. In a simple embodiment, a model comprises an average set of data that matches the period of data.

Model deploy engine 208 operates to deploy a reduced model if the received model does not fully fit the data, and for deploying the received model if the received model fits substantially all of the data, in an embodiment of the invention.

Model deploy method 300 comprises model deploy method 300A of the exemplary embodiment or comprises model deploy method 300B of an alternative embodiment.

Figure 3A:
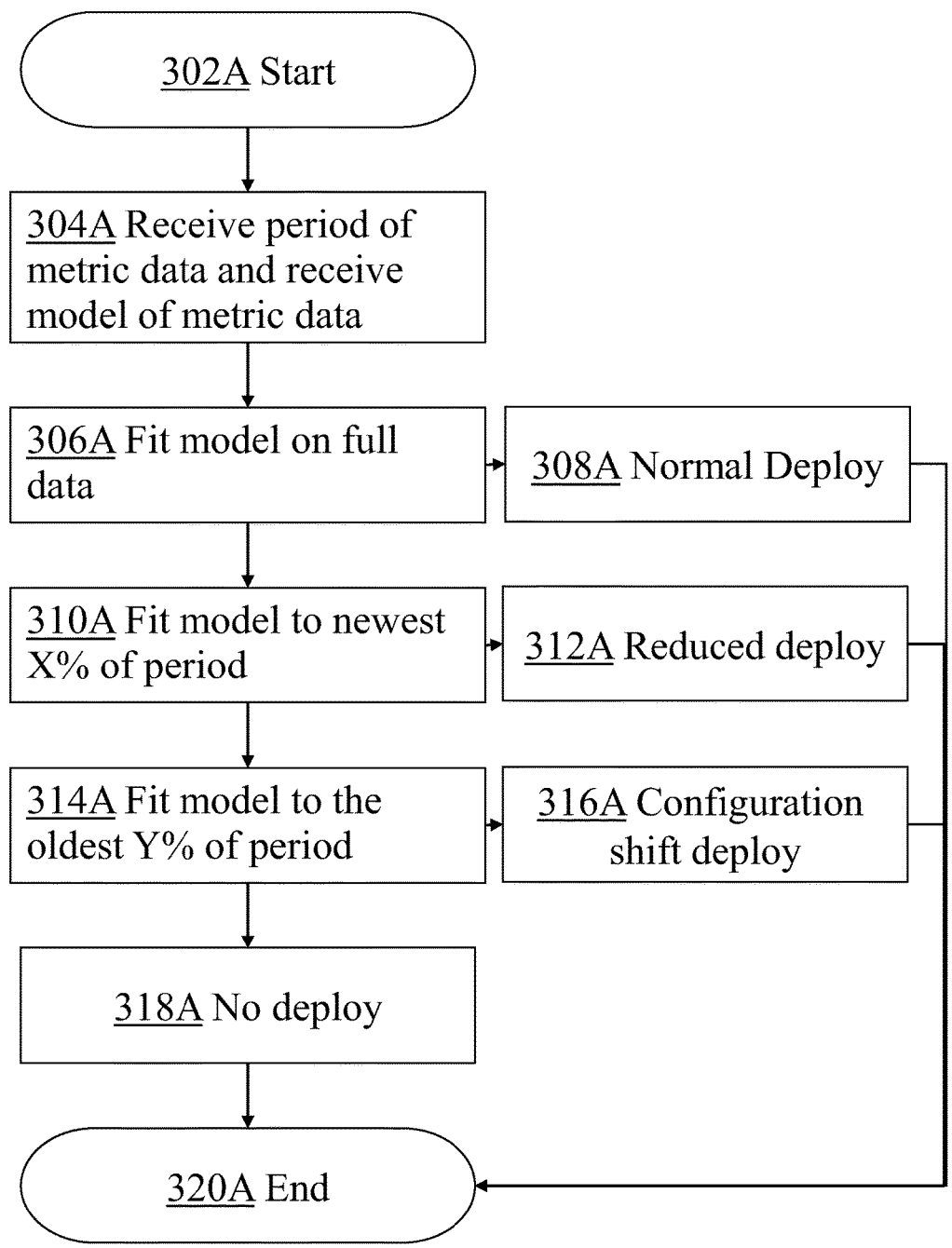
FIG. 3A is a flow diagram of a process, in accordance with an embodiment of the present invention.

Referring to FIG. 3A, exemplary embodiment method 300A comprises logical process steps 302A to 320A. Although there is an order to the exemplary embodiment steps as described, the steps may not necessarily need to be in this order and in other embodiments steps can be in a different order.

Step 302A is the start of the main method as initiated by a user after a model of data has been built.

Step 304A is for receiving a period of data into a buffer and for receiving a model of the period of data.

Step 306A is for testing the model with the full period of data and for deploying, at step 308A, the model if the model fits the whole period of data (in the exemplary embodiment a threshold of over 97% fit to the model is used). The model is fit to the data and if the fit is good then the method proceeds to step 308A or if the fit is not good then step 310A. An event or alert might be raised informing users of the type of pattern that has been fit.

Once step 308A has deployed the model in response to a fit to the data then step 320A.

Step 310A is for determining that the received model does not fit the whole period of data and that fitted part of the period of data (X %) comprises the most recent data. If it is so determined then the process branches to step 312A or else step 314A. The size of the fitted part of the period of data is tested initially at 99% of the whole period and the size is varied in decremental steps towards 50% of the period until there is a fit (or not).

Step 312A is for deploying the reduced model if the model does not fit the whole data but only a newest part of the period. Then step 320A.

Step 314A is for branching to step 316A if after testing the model fits only the oldest data of the period. Else step 318A. This step is optional.

Step 316A is for notifying a configuration shift if the model only fits the oldest part of the period of the data. If this model fits then a configuration shift is being observed. If there is insufficient data to train then the user is notified that this is occurring and no alarms can be raised. Then step 320A.

Step 318A is for not making a deployment or making suitable alternatives for the deployment.

Step 320A is the end of the method.

Figure 3B:
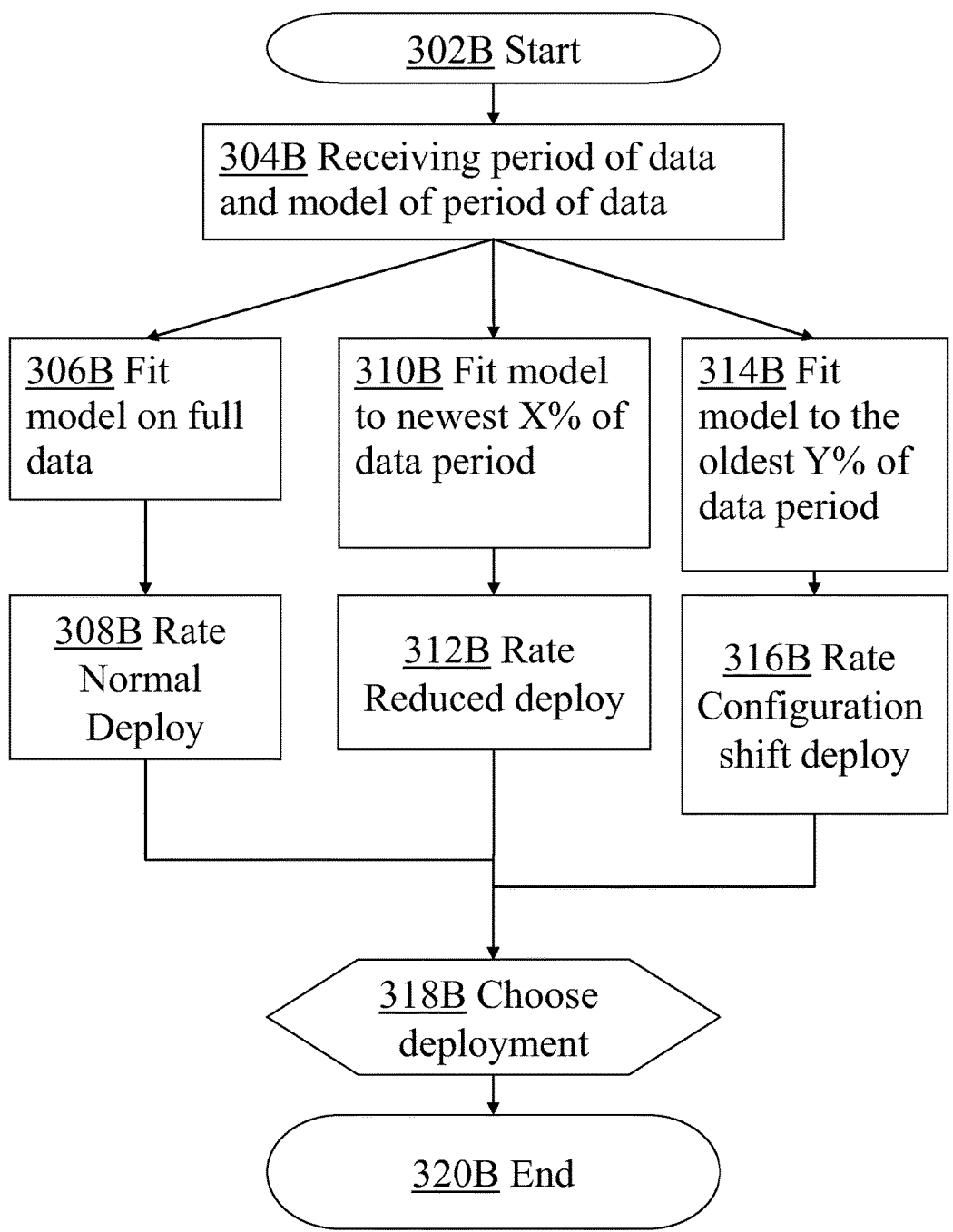

Referring to FIG. 3B, exemplary embodiment method 300B comprises logical process steps 302B to 320B.

Step 302B is the start of the main method as initiated by a user after a model of the period of data is built.

Step 304B is for receiving a period of data into a buffer and for receiving a model of the period of data. The process comprises three parallel process threads (306B, 310B and 314B) for determining what type of fit the model is to the data.

Step 306B is for testing the model with the full period of data and for rating, at step 308B, the fit of the model to the whole period of data (in practice a threshold of over 97% fit to model data is used). The model is fit to the data and the method proceeds to step 308B.

Step 308B is for rating the fit of the model for a normal deployment and proceeding to step 318B. The rating will only be high if the fit is between 97% and 100%.

Step 310B is for fitting the received model over the newest part of the period of data to create a reduced model.

Step 312B is for rating the fit of the reduced model to the data. The rating will be high if the fit is between 50% and 97%. Then step 318B.

Step 314B is for fitting the received model to the oldest part of the period of data to form another reduced model.

Step 316B is for rating the fit of the second reduced model to the data. The rating will be high if the fit is between 50% and 97%. Then step 318B.

Step 318B is for choosing, based on the fit ratings made in previous steps, between a normal model deploy; a reduced deploy; a configuration shift deploy; or no deploy.

Step 320B is the end of the method.

Figure 4A:
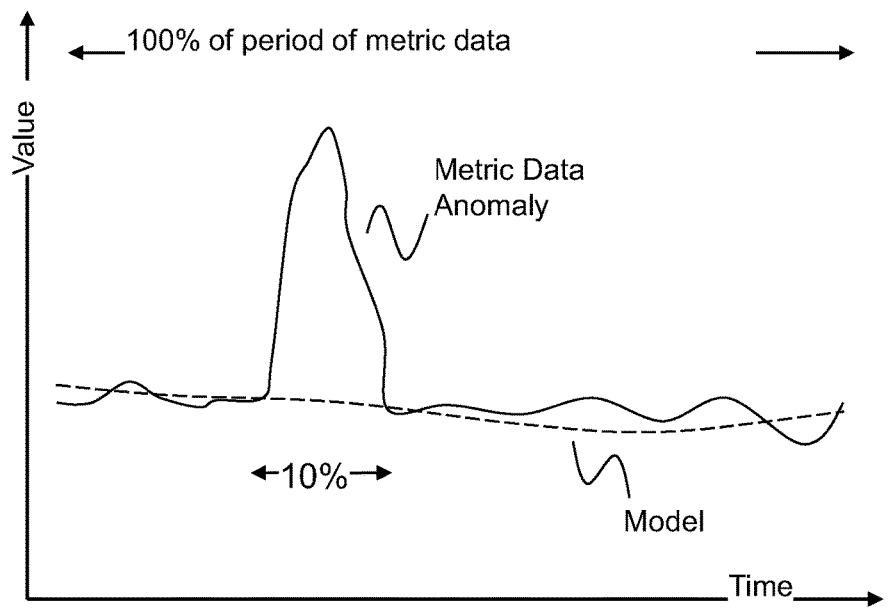
Figure 4B:
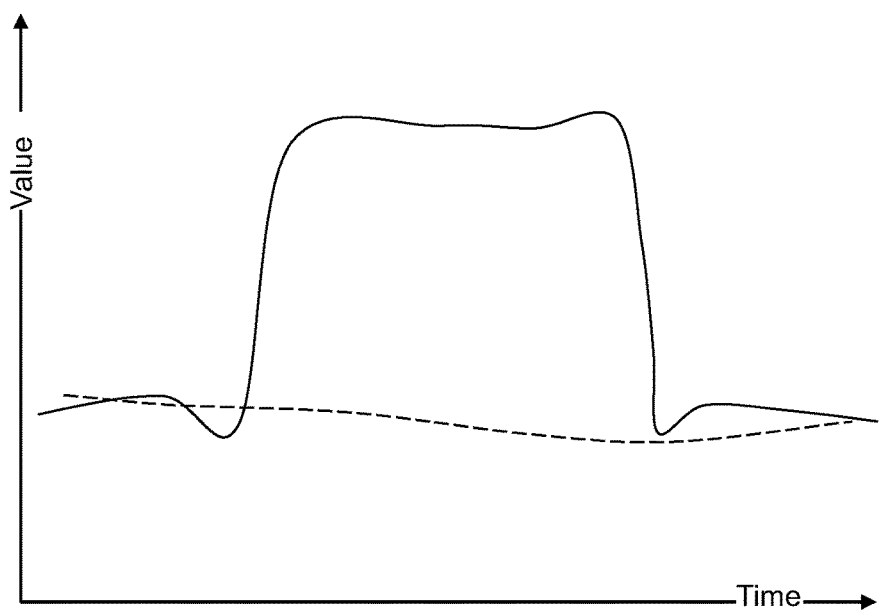
Figure 4C:
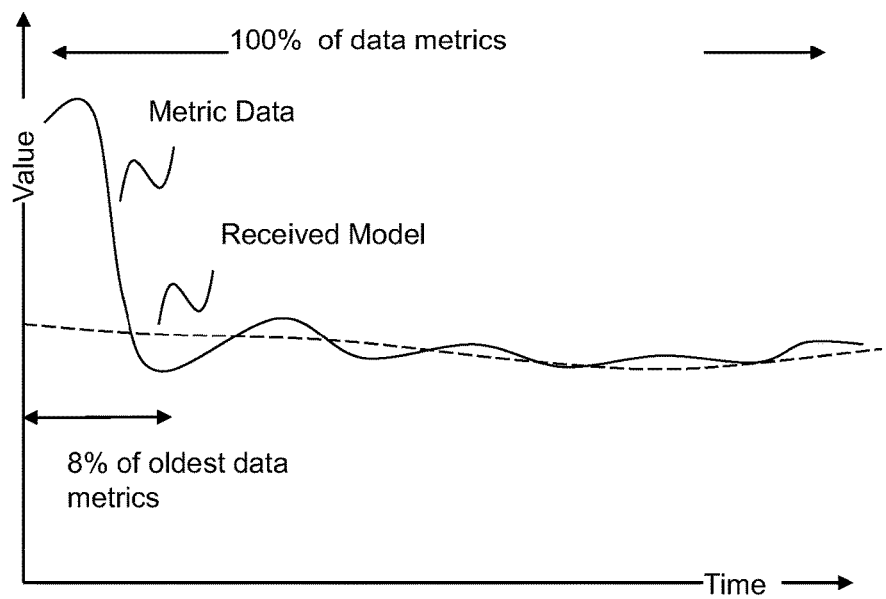
Figure 4D:
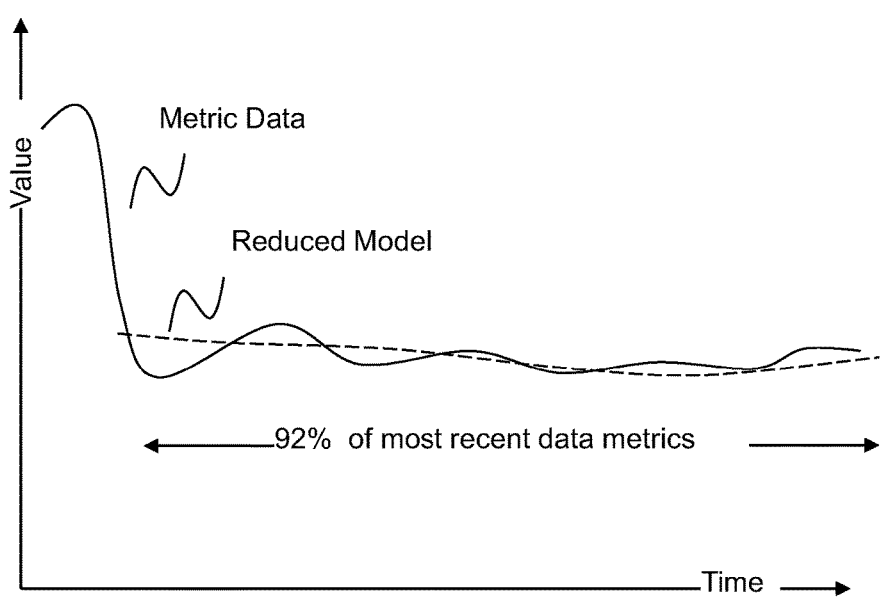

Referring to FIG. 4A to 4E, example periods of data are shown and described. FIGS. 4A, 4B, 4C and 4E have different types of anomalies corresponding to the operations of the exemplary embodiment. FIGS. 4C and 4D show the same anomaly.

Referring to FIG. 4A, an example anomaly spike is shown in the middle of a period of data, the data is shown in solid line and the model of the data is the dashed line. This is the type of anomaly that the model is purposed to identify and not one that is used to build or test the model before deployment. However, if it were used to test the model then the model would not be deployed.

Referring to FIG. 4B, a large anomaly is shown in the middle of the period of data. This anomaly is an example of a phase change and the model would be flagged as an incorrect model. This is a type of anomaly that the model can identify and not one that is used to build or test the model before deployment.

Referring to FIG. 4C, an 8% sized anomaly is shown in the oldest part of the period of data. The anomaly would be detected in the oldest part and 8% size ratio checked. In the example the threshold is 50% of the whole period of data so the anomaly falls easily within this and the received model is reduced and deployed.

Referring to FIG. 4D, the data metric of FIG. 4C is shown with the corresponding reduced model superimposed. In this example, the reduced model is of 92% of the most recent data.

Figure 4E:
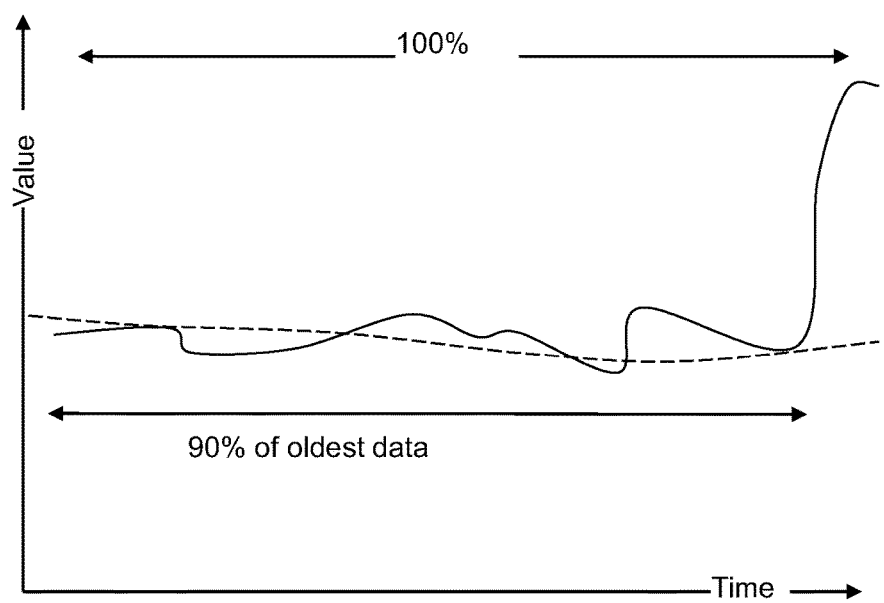

Referring to FIG. 4E, a 10% sized anomaly is shown in the newest part of the period of data. This anomaly would result in an assumption of a configuration shift and in the exemplary embodiment would not be deployed.

Further embodiments of the invention are now described. It will be clear to one of ordinary skill in the art that all or part of the logical process steps of the exemplary embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the exemplary embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the exemplary embodiment may alternatively be embodied fully or partially in a parallel computing system comprising two or more processors for executing parallel software.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for deploying a model for anomaly detection in time series data, the method comprising:
   receiving, by a computer, a period of data;
   receiving, by the computer, a model of the period of data;
   determining, by the computer, whether the received model fits a part of the period of data and whether the fitted part of the period of data comprises most recent data;
   on a positive determination, building, by the computer, a reduced model for the part of the period of data that fit the received model; and
   deploying, by the computer, the reduced model.

2. A method according to claim 1, wherein the model is deployed if the fitted part is not less than a threshold ratio of all of the period.

3. A method according to claim 2, wherein the threshold ratio of the determined part to whole period is 50%.

4. A method according to claim 1, further comprising deploying, by the computer, the received model if the received model fits all of the period of data.

5. A method according to claim 1, further comprising notifying, by the computer, a configuration shift if it is determined that the received model fits a portion of the oldest part of the period of data.

6. A method according to claim 1, wherein determining, by the computer, that the model fits only a newest part of the period of data comprises attempting to fit increasingly smaller newer portions of the data to the received model until a correct fit is found.

7. A method according to claim 1, wherein deploying the model is based on determining that the received model fits either an oldest or a newest part of the period of data.

8. A computer system for deploying an anomaly detection model for time series data, the computer system comprising:
   one or more computer processors, one or more computer-readable storage media, and program instructions stored on one or more of the computer-readable storage media for execution by at least one of the one or more processors, the program instructions comprising:
   program instructions to receive a period of data;
   program instructions to receive a model of the period of data;
   program instructions to determine whether the received model fits a part of the period of data and whether the fitted part of the period of data comprises most recent data;
   program instructions, on a determination that the fitted part of the period of data comprises the most recent data, to build a reduced model for the part of the period of data that fit the received model; and
   program instructions to deploy the reduced model.

9. A system according to claim 8, wherein the reduced model is deployed if the fitted part is not less than a threshold ratio of all of the period.

10. A system according to claim 9, wherein the threshold ratio of the determined part to the whole period is 50%.

11. A system according to claim 8, further comprising program instructions to deploy the received model if the received model fits all of the period of data.

12. A system according to claim 8, further comprising program instructions to notify a configuration shift if it is determined that the received model fits a portion of the oldest part of the period of data.

13. A system according to claim 8, wherein program instructions to determine that the model fits a newest part of the period of data comprise program instructions to attempt to fit increasingly smaller newer portions of the data to the received model until a correct fit is found.

14. A system according to claim 8 wherein deploying the model is based on determining that the received model fits neither an oldest or a newest part of the period of data.

15. A computer program product for deploying a model for anomaly detection in time series data, the computer program product comprising:

one or more computer-readable storage media and program instructions stored on the one or more computer-readable storage media, the program instructions comprising:

program instructions to receive a period of data;

program instructions to receive a model of the period of data;

program instructions to determine whether the received model fits a part of the period of data and whether the fitted part of the period of data comprises most recent data;

program instructions, on a positive determination, to build a reduced model for the part of the period of data that fit the received model; and program instructions to deploy the reduced model.

16. A computer program product according to claim 15, wherein the reduced model is deployed if the fitted part is not less than a threshold ratio of all of the period.

17. A computer program product according to claim 16, wherein the threshold ratio of the determined part to whole period is 50%.

18. A computer program product according to claim 15, further comprising program instructions to deploy the received model if the received model fits all of the period of data.

19. A computer program product according to claim 15, further comprising program instructions to notify a configuration shift if it is determined that the received model fits a portion of the oldest part of the period of data.

20. A computer program product according to claim 15, wherein program instructions to determine that the model fits a newest part of the period of data comprise program instructions to attempt to fit increasingly smaller newer portions of the data to the received model until a correct fit is found.

* * * * *